May 29, 1956

W. E. WYATT ET AL 2,747,256

PROCESS OF FORMING COMPOSITE STRIPS
OF BACKING AND BEARING METALS
Filed Aug. 31, 1953

INVENTORS
WILBUR E. WYATT
BY  JOHN M. ROBERTSON

ATTORNEYS

United States Patent Office 2,747,256
Patented May 29, 1956

2,747,256

PROCESS OF FORMING COMPOSITE STRIPS OF BACKING AND BEARING METALS

Wilbur E. Wyatt, Greensburg, Ind., and John M. Robertson, Birmingham, Mich., assignors to Bohn Aluminum & Brass Corporation, Detroit, Mich., a corporation of Michigan Application August 31, 1953, Serial No. 377,452

2 Claims. (Cl. 29—149.5)

The invention relates to the manufacture of bearings of that type in which the bearing metal is deposited upon and bonded to a backing strip of harder metal.

It is the object of the invention to obtain a simple process of producing a composite strip including the backing and bearing metals bonded to each other and from which the bearings may be subsequently fashioned. To this end the invention consists in the process as hereinafter set forth.

The backing metal usually employed for composite bearings is steel. The bearing metal which may be of various compositions is molded or otherwise deposited on the backing and must be thoroughly bonded thereto. Usually this is accomplished in the manufacture of each individual bearing. With the instant invention, instead of forming the composite bearings individually, the bearing metal is first deposited upon and bonded to a continuous strip of steel or other backing metal which may then be severed into sections from which the individual bearings are formed.

More specifically, the process includes first in comminuting the bearing metal; second, depositing the powdered metal upon the backing strip; third, heating to a sufficient temperature to sinter the comminuted material and also to bond it to the backing strip; and fourth, rolling or otherwise densifying the sintered metal to condition the same for use in the bearing.

Various compositions may be used for the bearing metal but having as the chief ingredient aluminum, the alloy may also contain up to 18% by weight of tin, up to 4% of silicon, up to 1% of iron, up to 2½% of magnesium, up to 2% of cadmium, up to 2% of lead and up to 2% of zinc, the metals other than the aluminum being present singly, or in various combinations, according to the requirements of the specific bearings to be manufactured.

An essential feature of the process is that the comminuted metal must be in condition to sinter and also that the backing metal should be conditioned to bond with the sintered metal. To accomplish these results, the heating of the materials is carried out in a non-oxidizing atmosphere, such as a neutral or preferably a reducing atmosphere. The surface of the steel strip should also be cleaned from any oxide and preferably plated with a coating of less corrosive material and better bonding material such as nickel.

Figure 1:
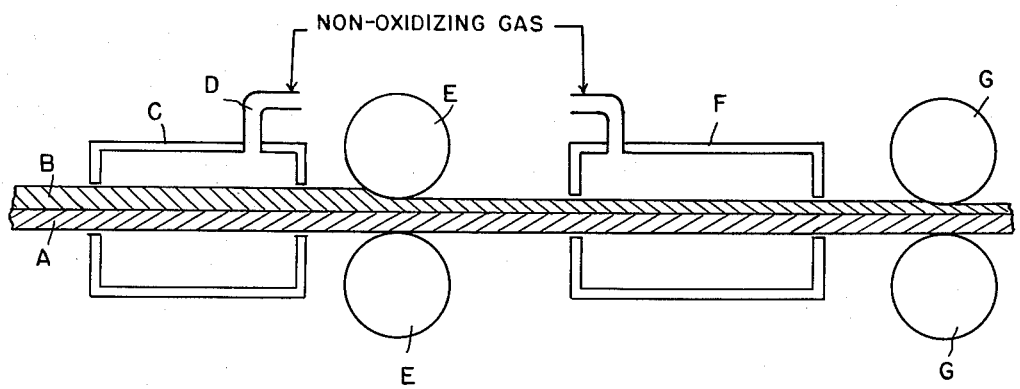
Fig. 1 is a diagram illustrating in different portions thereof the successive steps in the forming of the bonded backing and bearing metal strip.
Figure 2:
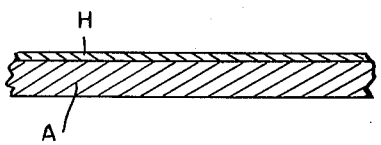
Fig. 2 is a similar view of a portion of Fig. 1 illustrating a modified process.

The successive steps of the process are diagrammatically illustrated in Fig. 1 of the drawings in which a steel strip A, the upper surface of which is cleaned or plated, has the comminuted material B deposited thereon to a suitable depth after which it is advanced into a furnace C supplied with a neutral or reducing atmosphere from a conduit D. The furnace may be heated by any suitable means not illustrated, and to a temperature which will effect the sintering of the comminuted material and initial bonding of the same to the surface of the strip A. The strip then passes out from the furnace between rollers E for densifying the sintered metal. If desired, it may be passed through another furnace F similarly supplied with a neutral or non-oxidizing atmosphere to further effect the sintering and the bonding operations. Finally, it is passed between finishing rollers G. As shown in Fig. 2, the backing strip A has its upper surface nickel plated as at H prior to depositing the comminuted metal thereon.

Another modification of the process is one in which the comminuted metal has the surface of the particles thereof coated by plating or other means with a more fusible metal to facilitate the bonding, both of the particles to each other and to the reinforcing strip.

It is obvious that the process may be modified to suit specific conditions, but essentially it includes the steps of depositing comminuted bearing metal on the backing strip, sintering or otherwise causing the particles to adhere to each other and to bond to the strip and rolling or otherwise finishing the composite strip.

What we claim as our invention is:

1. The process of forming composite strips of bearing and reinforcing metal comprising advancing a backing strip of reinforcing metal in the direction of its length, depositing a layer of comminuted aluminum base bearing metal at normal temperature on said strip and to a predetermined depth at one point in its advancement, passing said strip with the deposited layer of comminuted metal thereon through a heat treating furnace having a non-oxidizing atmosphere therein to sinter the comminuted metal and bond the same to said backing strip, and rolling to densify the sintered metal and increase the strength of said bond.

2. The process as in claim 1 in which the rolled composite strip is passed through another heat treating furnace and then again rolled to reduce the bearing layer to a predetermined thickness.

References Cited in the file of this patent

UNITED STATES PATENTS

| 1,654,509 | Claus | Dec. 27, 1927 |
| 2,198,253 | Koehring | Apr. 23, 1940 |
| 2,477,980 | Hensel | Aug. 24, 1948 |